(12) United States Patent
Gruber et al.

(10) Patent No.: US 9,140,180 B2
(45) Date of Patent: Sep. 22, 2015

(54) INTERNAL COMBUSTION ENGINE REFORMER INSTALLATION

(71) Applicant: GE Jenbacher GmbH & Co OG, Jenbach (AT)

(72) Inventors: Friedrich Gruber, Hippach (AT); Gunther Wall, Bad Haring (AT); Michael Url, Neufahrn (AT)

(73) Assignee: GE JENBACHER GMBH & CO OG, Jenbach (AT)

( * ) Notice: Subject to any disclaimer, the term of this patent is extended or adjusted under 35 U.S.C. 154(b) by 0 days.

(21) Appl. No.: 14/049,397

(22) Filed: Oct. 9, 2013

(65) Prior Publication Data
US 2014/0109845 A1 Apr. 24, 2014

(30) Foreign Application Priority Data
Oct. 24, 2012 (AT) .................................. 1145/2012

(51) Int. Cl.
| F02G 5/00 | (2006.01) |
| F02M 15/00 | (2006.01) |
| F02B 53/04 | (2006.01) |
| F02B 43/10 | (2006.01) |
| F02M 25/12 | (2006.01) |

(52) U.S. Cl.
CPC ................ *F02B 43/10* (2013.01); *F02M 25/12* (2013.01); *Y02T 10/121* (2013.01)

(58) Field of Classification Search
CPC .... F02B 29/0425; F02B 29/0437; F02C 3/20; F02C 3/30; F02C 7/00; F02C 7/10
USPC .................. 123/2, 3, 540, 543–557, 541, 542
See application file for complete search history.

(56) References Cited

U.S. PATENT DOCUMENTS

| 3,828,736 A | * | 8/1974 | Koch ................................. 123/3 |
| 3,915,125 A | * | 10/1975 | Henkel et al. ...................... 123/3 |
| 4,170,200 A | * | 10/1979 | Takeuchi et al. ................... 123/3 |
| 4,876,989 A | * | 10/1989 | Karpuk et al. ..................... 123/3 |
| 5,048,284 A | * | 9/1991 | Lywood et al. ................. 60/780 |

(Continued)

FOREIGN PATENT DOCUMENTS

| JP | 2001-152846 | 6/2001 |
| WO | 2008/150370 | 12/2008 |

OTHER PUBLICATIONS

Austrian Patent Office Search Report (ASR) issued Apr. 24, 2013 in Austrian Patent Application No. A 1145/2012.

*Primary Examiner* — Marguerite McMahon
*Assistant Examiner* — Tea Holbrook
(74) *Attorney, Agent, or Firm* — Wenderoth, Lind & Ponack, L.L.P.

(57) ABSTRACT

An internal combustion engine reformer installation comprises an internal combustion engine, a mixing device having a first feed conduit for a first substance flow and a second feed conduit for a second substance flow, wherein a mixture can be produced from the first and second substance flows in the mixing device, a reformer for reforming the mixture to afford a synthesis gas, a mixture conduit connected to the mixing device and the reformer, and a synthesis gas feed conduit connected to the reformer and the internal combustion engine. A first heat exchanger in heat-coupling relationship with the first feed conduit and a second heat exchanger in heat-coupling relationship with the second feed conduit are arranged in the synthesis gas feed conduit.

17 Claims, 3 Drawing Sheets

(56) References Cited

U.S. PATENT DOCUMENTS

| | | | |
|---|---|---|---|
| 5,343,699 A * | 9/1994 | McAlister | 60/273 |
| 5,357,908 A * | 10/1994 | Sung et al. | 123/3 |
| 5,927,075 A * | 7/1999 | Khair | 60/605.2 |
| 6,508,209 B1 | 1/2003 | Collier, Jr. | |
| 7,210,467 B2 * | 5/2007 | Kweon et al. | 123/557 |
| 2005/0279333 A1 * | 12/2005 | Kweon et al. | 123/557 |
| 2006/0054145 A1 * | 3/2006 | Hayashi et al. | 123/527 |
| 2007/0137191 A1 * | 6/2007 | Kweon et al. | 60/320 |
| 2008/0230018 A1 * | 9/2008 | Kobayashi | 123/3 |
| 2008/0295501 A1 | 12/2008 | Gong et al. | |
| 2011/0277734 A1 * | 11/2011 | McCann | 123/585 |
| 2012/0000435 A1 * | 1/2012 | Scotto | 123/3 |
| 2013/0213489 A1 * | 8/2013 | Von Trotha et al. | 137/13 |
| 2013/0220239 A1 * | 8/2013 | McCann | 123/3 |
| 2013/0229018 A1 * | 9/2013 | Karni et al. | 290/1 R |
| 2014/0069086 A1 * | 3/2014 | Lapointe et al. | 60/278 |

\* cited by examiner

INTERNAL COMBUSTION ENGINE REFORMER INSTALLATION

BACKGROUND OF THE INVENTION

1. Field of the Invention

The present invention concerns an internal combustion engine reformer installation having the features of a classifying portion.

2. Description of Related Art

Internal combustion engine reformer installations of the general kind set forth are to be found for example in U.S. Pat. No. 6,508,209 B1, JP 2001 152846 A or WO 2008/150370 A1. The inventions disclosed therein use the principle described hereinafter.

In a reformer a synthesis gas is produced from fuel, air and possibly steam and/or a portion of the exhaust gas flow of an internal combustion engine. The synthesis gas is then fed together with air and possibly further fuel to the internal combustion engine. That affords two advantages. On the one hand gases/emissions which are unwanted in the engine exhaust gas such as for example nitrogen oxides, carbon monoxide and unburnt hydrocarbons are reduced. On the other hand the synthesis gas is hydrogen-bearing, which improves the combustion characteristics and efficiency.

As on the one hand the substance flow directed into the reformer has to be preheated and on the other hand the synthesis gas has to be cooled before passing into the internal combustion engine a heat exchanger between those two substance flows is advantageous.

What is problematical in that respect is that the preheating temperature for the flow into the reformer cannot be selected to be just as high as may be desired as that mixture is in fact burnable and consequently high surface temperatures represent a safety risk. In addition, at excessively high temperatures, there is the risk of coking of the fuel, that is to say unwanted thermal decomposition of the hydrocarbons contained therein.

SUMMARY OF THE INVENTION

The object of the invention is to enhance the safety of such an installation and to control the coking tendency of the fuel. In addition the invention seeks to provide that the energy efficiency of the overall installation is increased by the more efficient use of the available energy flows.

That object is attained by an internal combustion engine reformer installation having the following features.

The fuel, optionally together with steam, and the air, optionally together with exhaust gas, is preheated by two heat exchangers separately from each other. That increases firstly the safety of the installation as the amount of inflammable gas in the installation is kept low. Secondly, lower preheating temperatures can be adopted for the fuel mixture than for the air mixture, which counteracts the fuel coking tendency and by way of the high temperatures possible thereby in preheating of the air-exhaust gas mixture increases the level of energy efficiency.

Further advantageous embodiments of the invention are defined in the appendant claims.

In the direction of providing a lower preheating temperature for the fuel, it can be provided that the corresponding heat exchanger is arranged in series after the other heat exchanger.

For the same purpose it can be provided that that heat exchanger which is in heat-coupling relationship with a fuel-bearing substance flow can be bypassed by a bypass conduit, whereby less hot synthesis gas passes into the heat exchanger.

It can further be provided that the heat transfer in the first heat exchanger is increased by way of the feed of steam from the steam feed conduit into the exhaust gas-air substance flow, whereby the temperature of the synthesis gas when passing into the second heat exchanger can be reduced.

In addition the addition of steam to the fuel gas prior to entering the second heat exchanger makes it possible to advantageously alter the thermodynamic equilibrium or the wall or surface temperature can be kept below a given value by structural measures in terms of the heat exchanger design.

If, in spite of the two heat exchangers, the synthesis gas on passing into the internal combustion engine were to be at a temperature which is excessively high for same, synthesis gas cooling can be arranged in the synthesis gas feed conduit. That cooling can be in the form of two series-connected cooling elements. That has the advantage that the waste heat of the cooling elements can be used for heating various other substance flows in the internal combustion engine reformer installation. To guarantee optimum conditions in the feed of the synthesis gas to the internal combustion engine the temperature of the synthesis gas on passing into the internal combustion engine should be between 30 and 40° C. To increase the energy efficiency of the overall installation the transfer of heat from the first heat exchanger in the synthesis gas cooling arrangement to a heat carrier (for example heating water) can be effected at a temperature of between 70° C. and 90° C.

It is preferably provided that the synthesis gas cooling is connected in series downstream of the heat exchangers to achieve high preheating temperatures for the substance flows intended for the reformer. It can also be provided that one or both of the cooling units includes a condensation separator and/or a drop separator for separating off water, particularly if steam is fed to the reformer. Cooling of the synthesis gas to a dew point temperature of about 30° C. in the second heat exchanger of the synthesis gas cooling arrangement and subsequent heating of the synthesis gas to about 40° C. by means of a heating element makes it possible to reduce the relative moisture content of the synthesis gas to a level which is admissible for operation of the engine. The heating element can be for example in the form of a heat exchanger in heat-coupling relationship with the heat flow which is taken from the synthesis gas by the first cooling element of the synthesis gas cooling arrangement.

To achieve a mixture of air and exhaust gas in the first substance flow it can further be provided that a further mixing device is connected in the first feed conduit in series upstream of the first heat exchanger, the further mixing device being connected to an air feed conduit and an exhaust gas feed conduit.

To achieve a mixture of fuel and steam in the second substance flow it can be provided that a further mixing device is connected in the second feed conduit in series upstream of the second heat exchanger, said further mixing device being connected to a fuel feed conduit and a steam feed conduit. The thermodynamic equilibrium can be advantageously altered by that addition of steam to the fuel gas before passing into the second heat exchanger or the wall or surface temperature can be kept below a given value by structural measures in terms of the heat exchanger design.

To provide a thermally efficient structure for an internal combustion engine reformer installation there can be provided a water feed conduit and a vaporizer connected to the water feed conduit and the steam feed conduit, wherein preferably the heat required for vaporization of the water can be supplied by way of a flow portion of the exhaust gas from the engine or by way of utilization of the heat from the synthesis gas.

To achieve a constant temperature in a fuel feed conduit leading to a further mixing device, there can be provided a preheating element for preheating the fuel. That preheating element can be of various different kinds of configuration. For example it can be in the form of a heat exchanger in heat-coupling relationship with the first cooling element of the synthesis gas cooling arrangement. If the internal combustion engine has a coolant circuit conduit for the circulation of a cooling fluid the preheating element in the fuel feed line can be in the form of a heat exchanger in heat-coupling relationship with the coolant circuit conduit.

In addition the preheating element in the fuel feed conduit can be in the form of a heat exchanger in heat-coupling relationship with the synthesis gas feed conduit. The embodiments described here of the preheating element in the form of a heat exchanger are expedient for thermal efficiency of the internal combustion engine reformer installation.

For particularly simple regulation or control of the installation at least one respective volume flow regulating valve can be arranged in the air feed conduit and/or in the fuel feed conduit and/or in the synthesis gas conduit and/or in the exhaust gas conduit and/or in the steam feed conduit and/or in the first feed conduit and/or in the second feed conduit.

It can further be provided that a heating element for feed water preheating is arranged in the water feed conduit. For the sake of thermal efficiency in that case it can be provided that the heating element is in the form of a heat exchanger in heat-coupling relationship with the synthesis gas feed conduit—preferably between the first cooling element and the second cooling element in the synthesis gas cooling arrangement.

BRIEF DESCRIPTION OF THE DRAWINGS

Further advantages and details of the invention will be apparent from the Figures and the related specific description. In the Figures.

DETAILED DESCRIPTION OF THE INVENTION

Figure 1:
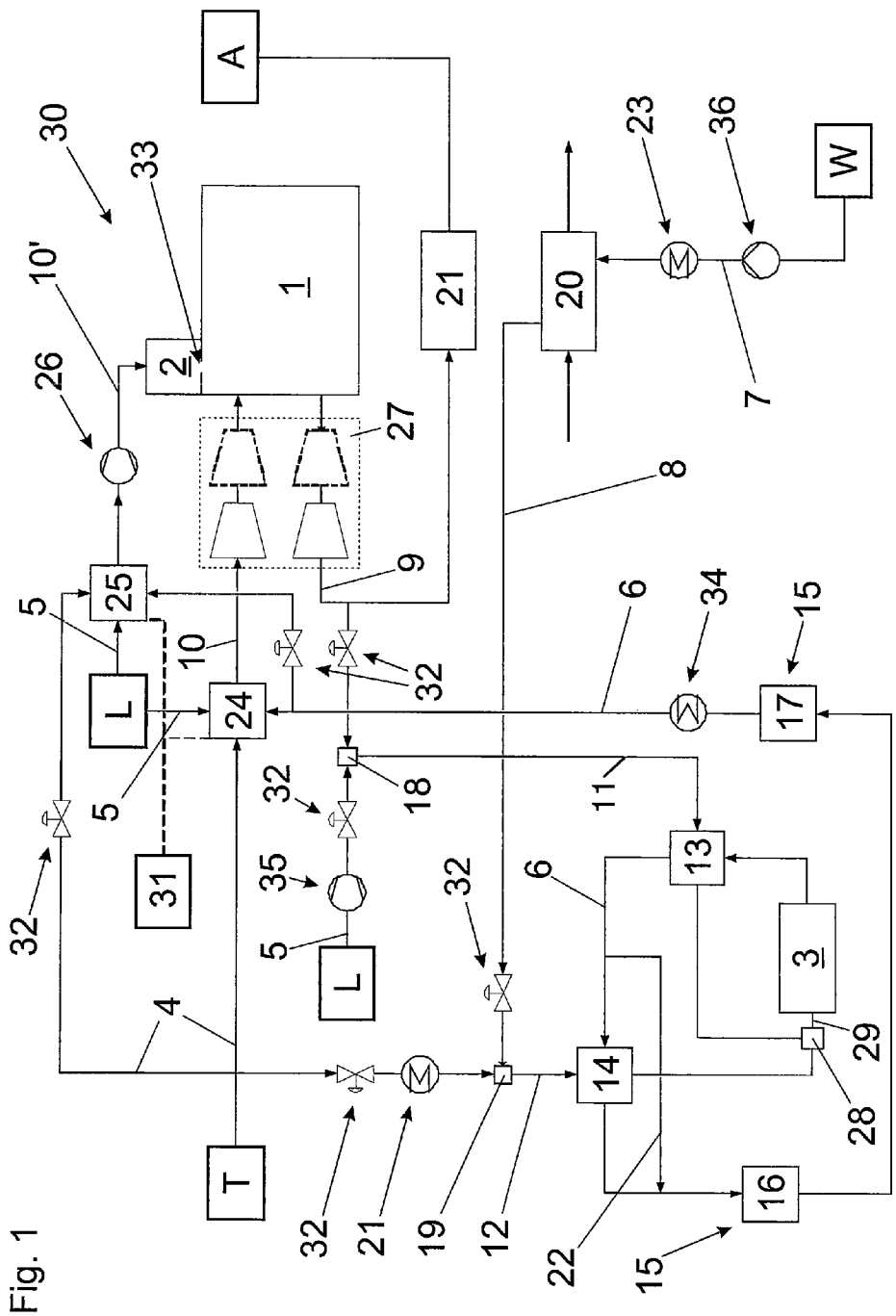
FIG. 1 shows the thermal circuitry of an internal combustion engine reformer installation according to the invention.

FIG. 1 shows the circuitry of an internal combustion engine reformer installation. It shows the main combustion 1, the pre-combustion chamber 2, the through-flow opening 33 and the reformer 3. Air L is fed to the internal combustion engine 30 by way of the air feed conduits 5, fuel from the fuel reservoir T is fed thereto by way of the fuel feed conduits 4 and synthesis gas is fed thereto by way of the synthesis gas feed conduit 6. The first combustion gas mixer 24 and the second combustion gas mixer 25 mix therefrom the first combustion mixture and the second combustion mixture respectively. The first combustion mixture is fed to the main combustion chamber 1 by way of the first mixture conduit 10 and the second combustion mixture is fed to the pre-combustion chamber 2 by way of the second mixture conduit 10'. In addition the internal combustion engine 30 has a compressor 26 in the second mixture conduit 10', a turbocharger 27 and an exhaust gas conduit 9. The precise configuration of the internal combustion engine 30 is however not important for the present invention, in particular the pre-combustion chamber 2, the compressor 26, the turbocharger 27 and the second combustion gas mixer 25 are not absolutely necessary.

The mixing ratios for the first combustion gas mixer 24 and the second combustion gas mixer 25 are determined in the control or regulating device 31, wherein it is connected to both combustion gas mixers. The connections of the regulating or control device 31 to all volume flow regulating valves 32 are not shown as that would be difficult in terms of drawing and would not contribute to understanding. There are in each case at least one volume flow regulating valve 32 in the fuel feed conduit 4, the air feed conduit 5, the synthesis gas feed conduit 6, the steam feed conduit 8 and the exhaust gas conduit 9 respectively.

Water is fed to a vaporizer 20 from a water reservoir W by means of the pump 36 by way of a water feed conduit 7. That vaporizer 20 can be of various different configurations. A preferred embodiment is one in which the vaporizer 20 is in the form of a heat exchanger in heat-coupling relationship with the exhaust gas conduit 9 or in the form of a heat exchanger in heat-coupling relationship with the synthesis gas conduit 6.

A heating element 23 for feed water preheating is arranged in the water feed conduit 7. This can also be in the form of a heat exchanger. In that case the heating element 23 can then be in heat-coupling relationship with the synthesis gas conduit 6 between the first cooling element 16 and the second cooling element 17 or in heat-coupling relationship with the first cooling element 16.

The steam generated in the vaporizer 20 is fed to the further mixing device 19 by way of a steam feed conduit 8. Fuel is also fed to the further mixing device 19 by way of a fuel conduit 4. The second substance flow is mixed from vapor and fuel in the further mixing device 19 and passed by way of the second feed conduit 12.

In addition disposed upstream of the mixing device 19 in the fuel conduit 4 is a preheating element 21 which can be in the form of a heat exchanger. In this case the preheating element can be in heat-coupling relationship with the first cooling element 16, with a coolant circuit of the internal combustion engine and/or with the synthesis gas conduit 6. The coolant circuit is not shown as it is well-known in the state of the art.

Air and exhaust gas from the internal combustion engine 30 are fed to the further mixing device 18 by way of an air feed conduit 5 and an exhaust conduit 9. The first substance flow is mixed therefrom in the further mixing device 18 and passed by way of the feed conduit 11.

The first feed conduit 11 and the second feed conduit 12 open into the mixing device 28 after they have passed through the first heat exchanger 13 and the second heat exchanger 14 respectively. A mixture is produced in the mixing device 28, the mixture being fed to the reformer 3 by way of the mixture conduit 29. The synthesis gas feed conduit 6 leading from the reformer 3 passes through the first heat exchanger 13 and the second heat exchanger 14, wherein a bypass conduit 22 can be provided as a bypass around the second heat exchanger 14. Also arranged in the synthesis gas feed conduit 6 is the synthesis gas cooling arrangement 15 comprising the first cooling element 16 and the second cooling element 17.

The synthesis gas can be warmed again by means of the warming element 34 in the synthesis gas feed conduit 6 after synthesis gas cooling. The relative moisture content of the synthesis gas can be kept at the level suitable for the engine by the succession of cooling down, water separation and warming.

A heat exchanger 21 is arranged in the exhaust gas conduit 9.

In this embodiment a compressor 35 is arranged in the air feed conduit 5.

Figure 2:
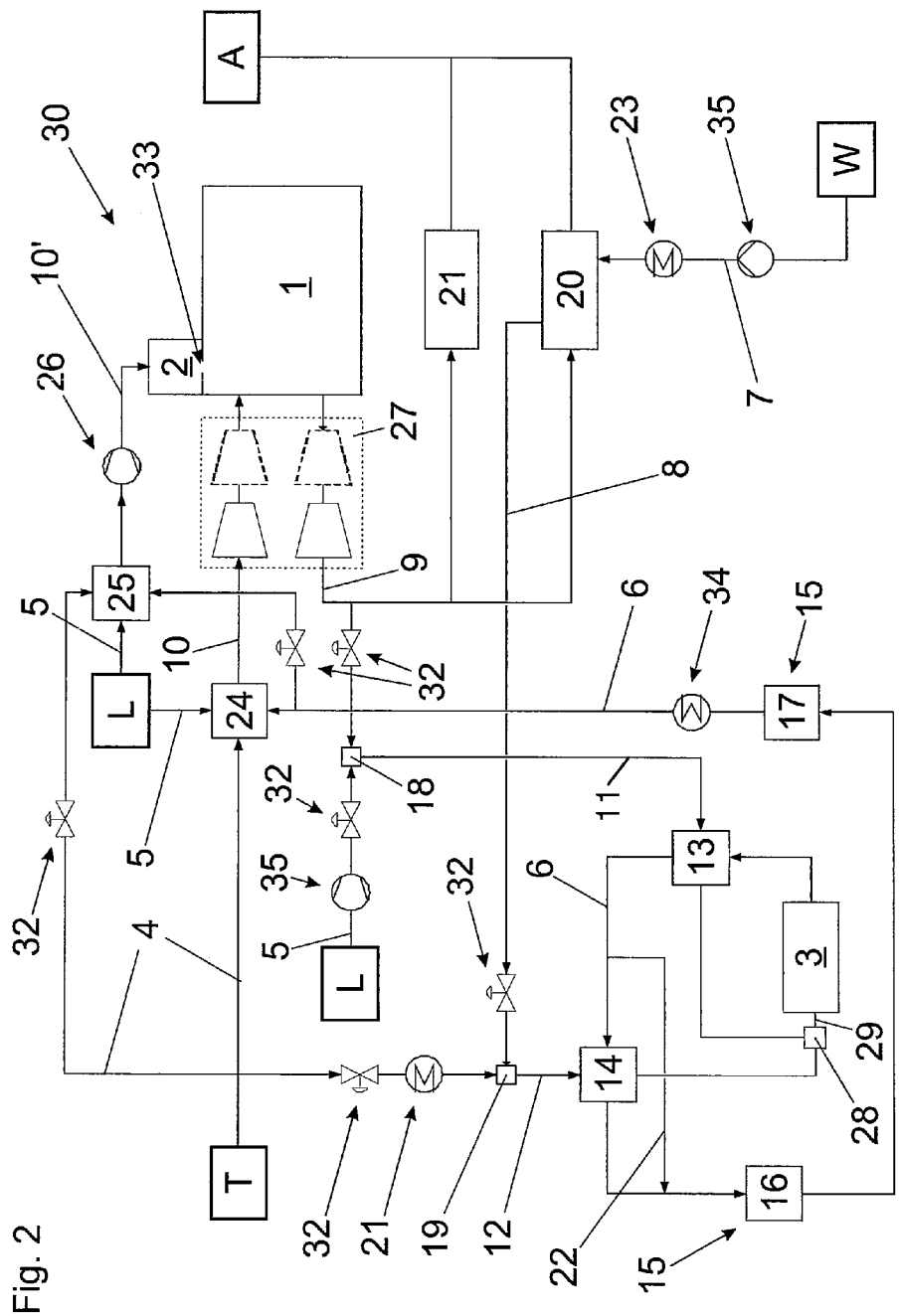
FIG. 2 shows by way of example the configuration of a vaporizer in the form of a heat exchanger in heat-coupling relationship with the exhaust gas conduit.

FIG. 2 shows by way of example the configuration of the vaporizer 20 in the form of a heat exchanger in heat-coupling relationship with the exhaust gas conduit 9. Further embodiments in which the vaporizer 20, the preheating element 21, the heating element 23 and the warming element 34 are in the form of heat exchangers in heat-coupling relationship with various substance flows are not explicitly shown in Figures as the design configurations are obvious to the man skilled in the art.

Figure 3:
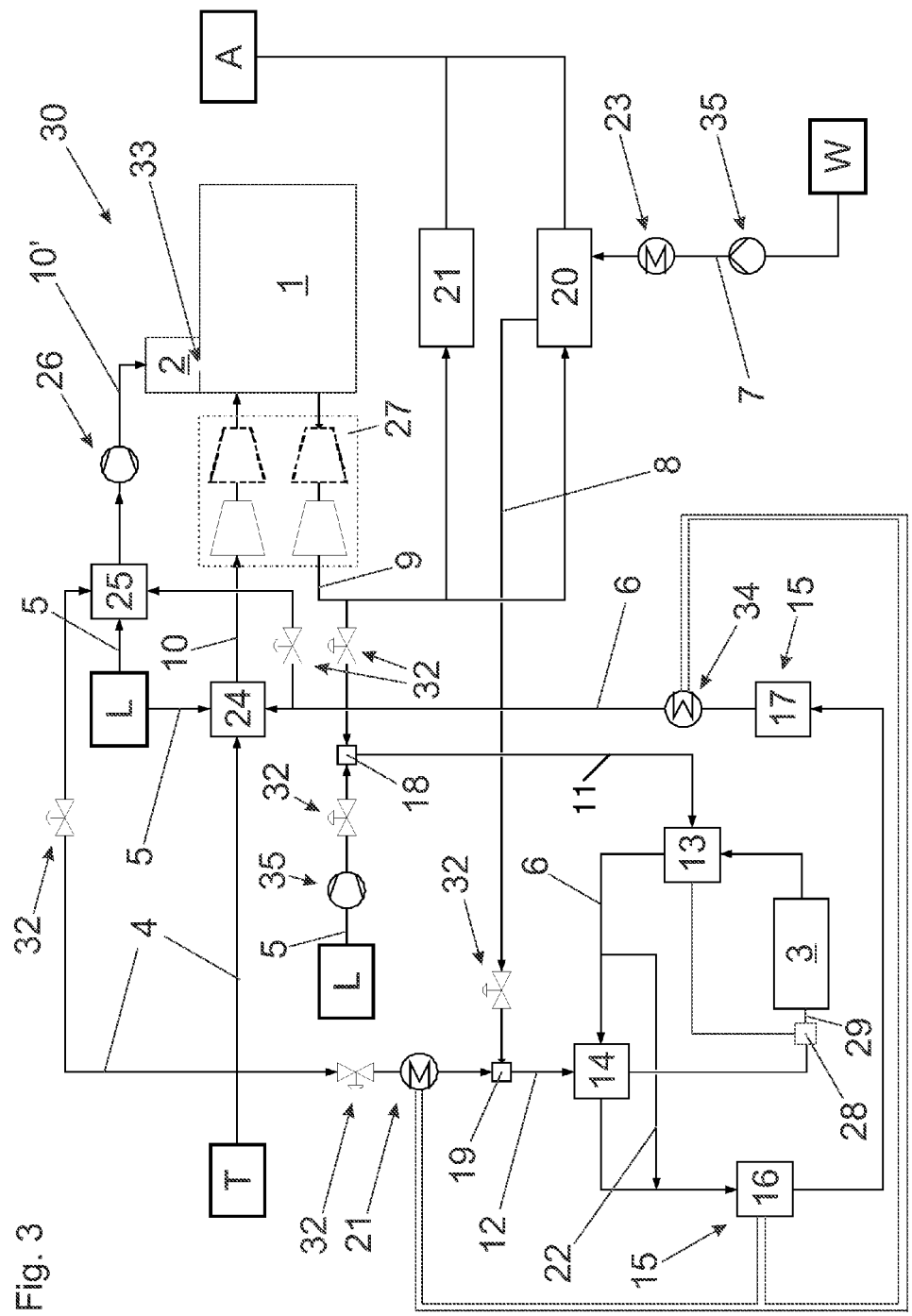
FIG. 3 shows the thermal circuitry of the internal combustion engine reformer installation according to the invention.

FIG. 3 also shows the circuitry of the internal combustion engine reformer installation.

The invention claimed is:

1. An internal combustion engine reformer installation comprising:
    an internal combustion engine,
    a first mixing device having a first feed conduit for a first substance flow and a second feed conduit for a second substance flow, wherein a mixture can be produced from the first and second substance flows in the first mixing device,
    a reformer for reforming the mixture to afford a synthesis gas,
    a mixture conduit connected to the first mixing device and the reformer,
    a synthesis gas feed conduit connected to the reformer and the internal combustion engine, and
    a second mixing device connected in series before the first heat exchanger in the first feed conduit;
    wherein arranged in the synthesis gas feed conduit are a first heat exchanger in heat-coupling relationship with the first feed conduit and a second heat exchanger in heat-coupling relationship with the second feed conduit, and
    wherein the second mixing device is connected to a fuel feed conduit and a steam feed conduit, and is configured to contain the second substance flow which can be produced in the form of a mixture of fuel and steam.

2. The internal combustion engine reformer installation as set forth in claim 1, wherein the first heat exchanger is arranged in series before the second heat exchanger.

3. The internal combustion engine reformer installation as set forth in claim 1, wherein a bypass conduit is respectively connected to the synthesis gas feed conduit before and after the second heat exchanger.

4. The internal combustion engine reformer installation as set forth in claim 1, wherein a synthesis gas cooling means is arranged in the synthesis gas feed conduit.

5. The internal combustion engine reformer installation as set forth in claim 4 wherein the synthesis gas cooling means is a first cooling element and a second cooling element connected in series.

6. The internal combustion engine reformer installation as set forth in claim 5 wherein the first cooling element and/or the second cooling element includes a condensation separator and/or a drop separator for separating off water.

7. The internal combustion engine reformer installation as set forth in claim 4 wherein the synthesis gas cooling means is connected in series after the first heat exchanger and the second heat exchanger.

8. The internal combustion engine reformer installation as set forth in claim 4 wherein a warming element is arranged in the synthesis gas feed conduit in series after the synthesis gas cooling means.

9. The internal combustion engine reformer installation as set forth in claim 1 having an exhaust gas conduit connected to the internal combustion engine, wherein a water feed conduit and a vaporizer are connected to the water feed conduit and the steam feed conduit.

10. The internal combustion engine reformer installation as set forth in claim 9 wherein a heating element is provided in the water feed conduit.

11. The internal combustion engine reformer installation as set forth in claim 9 wherein heat required for vaporization of water is supplied by way of heat content of exhaust gas in the exhaust gas conduit.

12. The internal combustion engine reformer installation as set forth in claim 1 wherein a preheating element for preheating fuel is provided in a fuel feed conduit.

13. The internal combustion engine reformer installation as set forth in claim 12 wherein the preheating element in the fuel feed conduit is in the form of a heat exchanger in heat-coupling relationship with a first cooling element of a synthesis gas cooling means.

14. The internal combustion engine reformer installation as set forth in claim 12 having a coolant circuit conduit for the circulation of a cooling fluid through the internal combustion engine, wherein the preheating element in the fuel feed conduit is in a heat exchanger in heat-coupling relationship with the coolant circuit conduit.

15. The internal combustion engine reformer installation as set forth in claim 12, wherein the preheating element in the fuel feed conduit is a heat exchanger in heat-coupling relationship with the synthesis gas feed conduit.

16. The internal combustion engine reformer installation as set forth in claim 1 wherein arranged in an air feed conduit and/or in a fuel feed conduit and/or in the synthesis gas feed conduit and/or in the exhaust gas conduit and/or in the steam feed conduit and/or in the first feed conduit and/or in the second feed conduit is at least one respective volume flow regulating valve.

17. An internal combustion engine reformer installation comprising:
    an internal combustion engine,
    a first mixing device having a first feed conduit for a first substance flow and a second feed conduit for a second substance flow, wherein a mixture can be produced from the first and second substance flows in the first mixing device,
    a reformer for reforming the mixture to afford a synthesis gas,
    a mixture conduit connected to the first mixing device and the reformer,
    a synthesis gas feed conduit connected to the reformer and the internal combustion engine, and
    a second mixing device connected in series before the first heat exchanger in the first feed conduit;
    wherein arranged in the synthesis gas feed conduit are a first heat exchanger in heat-coupling relationship with the first feed conduit and a second heat exchanger in heat-coupling relationship with the second feed conduit, and
    wherein the second mixing device is connected to an air feed conduit and an exhaust gas conduit, and is configured to contain the first substance flow which can be produced from air, exhaust gas or a mixture of air and exhaust gas.

* * * * *

UNITED STATES PATENT AND TRADEMARK OFFICE
CERTIFICATE OF CORRECTION

PATENT NO. : 9,140,180 B2  
APPLICATION NO. : 14/049397  
DATED : September 22, 2015  
INVENTOR(S) : Gruber et al.

Page 1 of 1

It is certified that error appears in the above-identified patent and that said Letters Patent is hereby corrected as shown below:

On the title page item [72], under "Inventors", in Column 1, Line 2, delete "Gunther" and insert -- Günther --, therefor.

Signed and Sealed this  
Twenty-first Day of June, 2016

Michelle K. Lee  
*Director of the United States Patent and Trademark Office*